(12) United States Patent
Tava

(10) Patent No.: US 10,145,695 B2
(45) Date of Patent: Dec. 4, 2018

(54) METHOD AND APPARATUS FOR DETERMINING A ROUTE AND CORRECTION VALUES FOR HEURISTIC VALUES

(71) Applicant: Bayerische Motoren Werke Aktiengesellschaft, Munich (DE)

(72) Inventor: Marcello Tava, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 14/973,851

(22) Filed: Dec. 18, 2015

(65) Prior Publication Data

US 2016/0102989 A1    Apr. 14, 2016

Related U.S. Application Data

(63) Continuation of application No. PCT/EP2014/060908, filed on May 27, 2014.

(30) Foreign Application Priority Data

Jun. 20, 2013  (DE) .......................... 10 2013 211 602

(51) Int. Cl.
*G01C 21/34*    (2006.01)
(52) U.S. Cl.
CPC ......... *G01C 21/34* (2013.01); *G01C 21/3446* (2013.01)
(58) Field of Classification Search
CPC combination set(s) only.
See application file for complete search history.

(56) References Cited

U.S. PATENT DOCUMENTS 5,684,704 A    11/1997    Okazaki
5,938,720 A    8/1999    Tamai
(Continued)

FOREIGN PATENT DOCUMENTS

DE    195 47 253 A1    8/1996
DE    698 25 924 T2    9/2005
(Continued)

OTHER PUBLICATIONS

International Search Report (PCT/ISA/210) issued in PCT Application No. PCT/EP2014/060908 dated Sep. 22, 2014 with English translation (five pages).
(Continued)

*Primary Examiner* — Adam D Tissot
*Assistant Examiner* — Edward J Pipala
(74) *Attorney, Agent, or Firm* — Crowell & Moring LLP

(57)    ABSTRACT

The route from a prescribed starting node to a prescribed destination node is determined on the basis of digital map data stored in a memory unit such that, for possible expansion of a respective current node, total costs are determined for the current node on the basis of a sum of edge costs for an optimum route from the starting node to the current node and a destination-node-related heuristic value for the current node and a prescribed destination-node-related correction value. The destination-node-related correction value is in this case representative of a mean value for cost ratios for respective nodes in a prescribed set, wherein the respective cost ratios are dependent on the edge costs of the connections that are situated between the current node and the respective node in the set and that represent an optimum route between the current node and this node in the set and on a heuristic value for the current node in relation to this node in the set.

20 Claims, 9 Drawing Sheets

(56) References Cited

U.S. PATENT DOCUMENTS

| | | | |
|---|---|---|---|
| 6,049,753 A * | 4/2000 | Nimura | G01C 21/3484 701/428 |
| 6,061,736 A * | 5/2000 | Rochberger | H04L 45/12 370/406 |
| 6,125,323 A * | 9/2000 | Nimura | G01C 21/30 340/988 |
| 2006/0047421 A1 | 3/2006 | Goldberg et al. | |
| 2007/0129885 A1 * | 6/2007 | Wellmann | G01C 21/3446 701/428 |
| 2008/0275639 A1 * | 11/2008 | Yun | G01C 21/3492 701/533 |
| 2009/0164111 A1 * | 6/2009 | Hosoi | G01C 21/3453 701/532 |
| 2009/0234569 A1 | 9/2009 | Jansen et al. | |
| 2010/0228472 A1 * | 9/2010 | Nagel | G01C 21/34 701/423 |
| 2011/0158232 A1 * | 6/2011 | Nesbitt | H04L 45/00 370/389 |
| 2012/0029800 A1 * | 2/2012 | Kluge | G01C 21/32 701/117 |
| 2012/0029804 A1 | 2/2012 | White et al. | |
| 2012/0179362 A1 * | 7/2012 | Stille | G01C 21/3469 701/410 |
| 2012/0271542 A1 * | 10/2012 | Arcot | G01C 21/3492 701/411 |
| 2013/0163467 A1 * | 6/2013 | Tesov | H04L 45/12 370/254 |
| 2014/0058673 A1 * | 2/2014 | Wolf | G01C 21/3469 701/533 |

FOREIGN PATENT DOCUMENTS

| | | |
|---|---|---|
| DE | 10 2008 027 957 A1 | 10/2009 |
| DE | 10 2010 030 715 A1 | 1/2012 |
| DE | 10 2010 040 730 A1 | 2/2012 |
| EP | 1 988 362 A1 | 11/2008 |

OTHER PUBLICATIONS

German Search Report issued in counterpart German Application No. 10 2013 211 602.0 dated Nov. 8, 2013 with partial English translation (10 pages).

* cited by examiner

Prior Art

METHOD AND APPARATUS FOR DETERMINING A ROUTE AND CORRECTION VALUES FOR HEURISTIC VALUES

CROSS REFERENCE TO RELATED APPLICATIONS

This application is a continuation of PCT International Application No. PCT/EP2014/060908, filed May 27, 2014, which claims priority under 35 U.S.C. §119 from German Patent Application No. 10 2013 211 602.0, filed Jun. 20, 2013, the entire disclosures of which are herein expressly incorporated by reference.

This application contains subject matter related to U.S. application Ser. No. 14/973,868, entitled "Method for Determining Correction Values for a Route Calculation Algorithm" filed on Dec. 18, 2015.

BACKGROUND AND SUMMARY OF THE INVENTION

The invention relates to a method and an apparatus for determining a route for a navigation system and/or a driver assistance system. The invention also relates to a method for determining correction values for a route calculation algorithm and to a system which includes the apparatus for determining the route.

In vehicle navigation systems, the so-called A* algorithm is used in many cases to calculate the route. This algorithm is used to calculate a shortest path between a starting node and one or more arbitrary nodes in a graph with a positive edge weight. In graph theory, a graph is a set of points, the points partially being connected to one another by means of so-called edges. The points are also called nodes. The edges are also referred to as lines or connections. The shape of the points and edges does not play a role in graph theory. In graph theory, a real number assigned to the respective edge is referred to as the edge weight. The real number may represent, for example, a distance, a time period or a gasoline consumption.

The A* algorithm uses an estimation function (heuristics) in order to search in a targeted manner and therefore to reduce the run-time. However, if the estimation function does not represent the real route and/or path conditions in an area with sufficient accuracy, the calculation of the optimum route may take a very long time.

The object on which the invention is based is to provide a method and an apparatus for determining a route, a method for determining correction values for a route calculation algorithm and a system which contribute to increasing efficiency of the route determination, in particular accelerating the route determination.

According to a first and a second aspect of the invention, a method and a corresponding apparatus for determining a route for a navigation system and/or a driver assistance system are provided. The navigation system and/or driver assistance system is assigned at least one storage unit for storing digital map data for a route network and/or path network in a predefined area. In this case, the digital map data include respective nodes in the area and connections between the respective nodes in the area. The digital map data also include respective edge costs for the respective connections between the nodes and predefined correction values for the respective nodes. The route from a predefined starting node to a predefined destination node is determined on the basis of the digital map data stored in the storage unit in such a manner that, for a possible expansion of a respective current node, total costs are determined for the current node on the basis of a sum of edge costs of an optimum route from the starting node to the current node and a destination-node-based heuristic value for the current node, which represents respectively estimated costs from the current node to the destination node, and a predefined destination-node-based correction value. In this case, the destination-node-based correction value is representative of a mean value of cost ratios of respective nodes in a predefined set, the respective cost ratios being dependent on the edge costs of the connections, which lie between the current node and the respective node in the set and represent an optimum route between the current node and this node in the set, and a heuristic value for the current node with respect to this respective node in the set.

Data relating to the determined route can be forwarded to the navigation system for optically and/or acoustically signaling the determined route, for example on a display, and/or for determining and outputting driving instructions. Additionally or alternatively, the data may be forwarded to the driver assistance system, the predefined driver assistance system being designed to control predefined vehicle functions of a vehicle on the basis of the determined data relating to the route.

The respective cost ratio is a direct measure of a discrepancy between the heuristic value for the current node with respect to the respective node in the set and the sum of the edge costs of an optimum route from the current node to the respective node in the set.

The destination-node-based heuristic value can be assessed, for example, using the destination-node-based correction value. For example, if the destination-node-based heuristic value does not represent the real route and/or path conditions in the area with sufficient accuracy, the destination-node-based heuristic value may have an excessively small value. This can be at least partially compensated for by means of the assessment using the destination-node-based correction value. In comparison with the determination of the route without correction values, the optimum route can be determined with considerably fewer calculation steps when using the correction values.

The sets of nodes for which respective correction values are predefined may include a different number of nodes depending on the requirements. An additionally required need for storage space for storing the correction values can therefore be kept suitably low.

The edge costs and the estimated costs have a predefined correspondence. The edge costs represent a value of a weighting function. The weighting function weights respective individual edge costs of the respective connection, for example route length costs and/or journey time costs, in a predefined manner. The estimated costs represent the value of an estimation function which weights estimated individual costs, for example estimated route length residual costs from a current node to the destination node and/or estimated journey time residual costs from the current node to the destination node, in a predefined manner similar to the weighting function. In a simplified case, the edge costs may represent, for example, the route length costs of the respective connection and the estimated costs may represent, for example, the estimated route length residual costs, for example the Euclidean distance, between the current node and the destination node.

The optimum route is optimum with respect to the edge costs. The destination-node-based correction values are at least one subset of the predefined correction values.

Expanding a node means that, starting from this node, the total costs of further nodes having a connection to this node are determined.

The route can be determined, for example, according to an A* algorithm. In the A* algorithm, the node having the lowest total costs is respectively expanded next. For the decision regarding whether the current node is expanded in the next step, the total costs of the current node are determined and compared with the total costs of further possible expansion nodes.

In one advantageous refinement of the first and second aspects of the invention, the digital map data include the respective positions of the nodes, and the destination-node-based heuristic value is determined on the basis of the position of the current node and the position of the destination node. A storage capacity of the storage unit can therefore be advantageously kept low.

In another advantageous refinement of the first and second aspects of the invention, the digital map data includes predefined heuristic values for the respective nodes with respect to the respective other nodes in the area which each represent estimated costs from one node in each case to the other node in each case, and the destination-node-based heuristic value is therefore predefined. This advantageously makes it possible to save computing capacity since the destination-node-based heuristic values can be determined in advance and therefore independently of a current route calculation.

In another advantageous refinement of the first and second aspects of the invention, the respective destination-node-based heuristic value represents the Euclidean distance between the current node and the destination node. The destination-node-based heuristic values can therefore be advantageously determined in a very simple manner; in particular, the required data are already available in the storage unit. Furthermore, the Euclidean distance to the destination is a monotonous estimation function (heuristics) and therefore complies with, in particular, the reliability prerequisite for the A* algorithm.

In another advantageous refinement of the first and second aspects of the invention, the heuristic value for the current node with respect to the respective node in the set represents the Euclidean distance between the current node and this respective node in the set. The heuristic values can therefore be advantageously determined in a very simple manner.

In another advantageous refinement of the first and second aspects of the invention, the area is subdivided into a plurality of segment regions, and the predefined set of nodes includes selected nodes which are arranged in a destination node segment region which includes at least the destination node. This advantageously makes it possible to predefine the correction values with sufficient accuracy, with the result that the route can be determined more efficiently. Alternatively, the predefined set of nodes may also include all nodes arranged in a destination node segment region. The selected nodes can be selected stochastically and/or on the basis of at least one predefined rule, for example.

In another advantageous refinement of the first and second aspects, the mean value of the cost ratios of the nodes in the set represents an arithmetic mean value of the cost ratios. This has the advantage that the respective correction values can be easily provided.

In another advantageous refinement of the first and second aspects, the respective segment region of the area includes a predefined radius region starting from the current node and a predefined angle region around the current node. This has the advantage that the respective correction values can be easily provided.

According to a third aspect of the invention, a method is provided for determining correction values for a route calculation algorithm on the basis of digital map data for a route network and/or path network in a predefined area. In this case, the digital map data include respective nodes in the area and connections between the respective nodes in the area. The digital map data also include respective edge costs for the respective connections between the nodes. At least one reference set of nodes is predefined for at least some of the nodes in the area for the respective node. A cost ratio for the respective node in the reference set is determined for the respectively predefined reference set of nodes. This cost ratio is determined on the basis of the edge costs of the connections, which lie between the node, for which the correction value is determined, and the respective node in the reference set and represent an optimum route between the node, for which the correction value is determined, and the node in the reference set, and the heuristic value for the node, for which the correction value is determined, with respect to the node in the reference set. A mean value is determined on the basis of the determined cost ratios of the nodes in this reference set, and the respective correction value is determined on the basis of the mean value.

Advantageous refinements of the first and second aspects also apply in this case to the third aspect.

The correction values can be advantageously determined independently of current route determination, for example during map compiling.

The heuristic value is determined using an estimation function which is also called heuristics. The estimation function may include, for example, a function for determining a shortest distance between two points in a predefined two-dimensional coordinate system (Euclidean distance). The prerequisite for the A* algorithm is that the estimation function is permissible. The estimation function is permissible if the respective heuristic value does not exceed the respective sum of the edge costs of the connections of the optimum route between two nodes to be considered. That is to say, the respective heuristic value must always be in the range [0; w] if w respectively denotes the sum of the edge costs of the connections of the optimum route between the two nodes to be considered.

The respective correction values can therefore be determined on the basis of adapted mean values if necessary, with the result that it can be ensured that the permissibility prerequisites of the A* algorithm are also complied with when using the correction values. For example, the respective mean values can be adapted by dividing them by a predefined factor which is greater than 1.

In one advantageous refinement of the third aspect, the digital map data include the respective positions of the nodes, and the heuristic value for the node, for which the correction value is determined, with respect to the respective node in the reference set is determined on the basis of the position of the node, for which the correction value is determined, and the position of the respective node in the reference set. This advantageously makes it possible to save storage capacity.

In another advantageous refinement of the third aspect, the digital map data include predefined heuristic values for the respective nodes with respect to the respective other nodes in the area which each represent estimated costs from one node in each case to the other node in each case, and the heuristic value for the node, for which the correction value is determined, with respect to the respective node in the reference set is therefore predefined. This advantageously makes it possible to save computing capacity when calculating the correction values.

In another advantageous refinement of the third aspect, the heuristic value for the node, for which the correction value is determined, with respect to the node in the reference set represents the Euclidean distance between the node, for which the correction value is determined, and the node in the reference set. This makes it possible to easily determine the correction values.

In another advantageous refinement of the third aspect, the area is subdivided into a plurality of segment regions starting from the respective node for which the correction values are calculated, and selected nodes in the respective segment regions each form one of the predefined reference sets of nodes. This has the advantage that the respective correction values can be easily determined. Alternatively, the respective predefined reference set may also include all nodes which are arranged in the respective segment region. The selected nodes may be selected stochastically and/or on the basis of at least one predefined rule, for example. All nodes arranged in the respective segment region are assigned the correction values which have been determined for this respective segment region.

In another advantageous refinement of the third aspect, the predefined segment regions of the area each include a predefined radius region starting from the respective node, for which the correction values are determined, and a predefined angle region around this node for which the correction values are determined. This has the advantage that the respective correction values can be easily determined.

According to a fourth aspect of the invention, a system is provided which has a storage unit and an apparatus according to the second aspect and in which the storage unit stores digital map data for a route network and/or path network in a predefined area. The apparatus is coupled to the storage unit using signaling and is designed to read the digital map data from the storage unit. In this case, the digital map data include respective nodes in the area and connections between the respective nodes in the area. Furthermore, the digital map data include predefined correction values for the respective nodes.

Advantageous refinements of the first and second aspects also apply in this case to the fourth aspect.

Other objects, advantages and novel features of the present invention will become apparent from the following detailed description of one or more preferred embodiments when considered in conjunction with the accompanying drawings.

DETAILED DESCRIPTION OF THE DRAWINGS

Elements with the same design or function are provided with the same reference symbols throughout the figures.

Figure 6A:
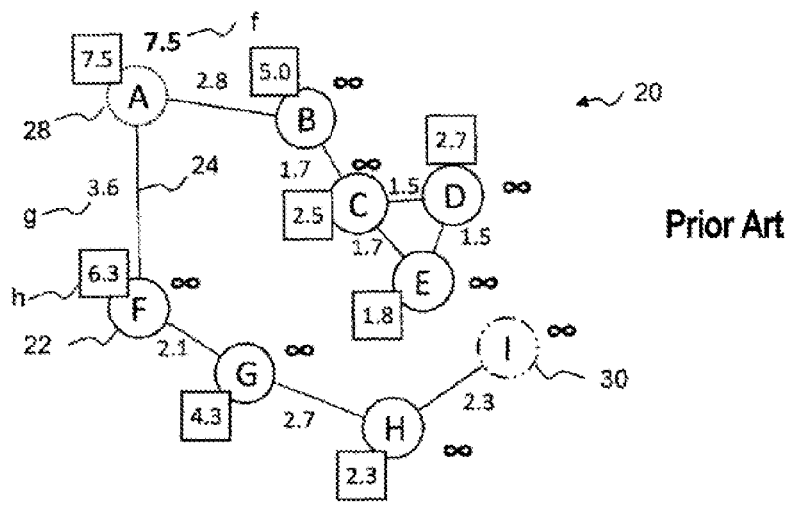
FIGS. 6A to 6C are diagrams for illustrating the determination of a route using the A* algorithm according to the prior art.
Figure 6B:
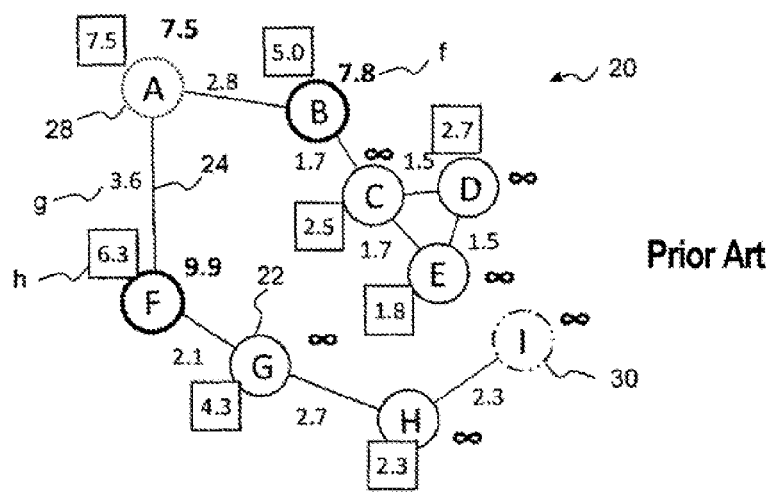
Figure 6C:
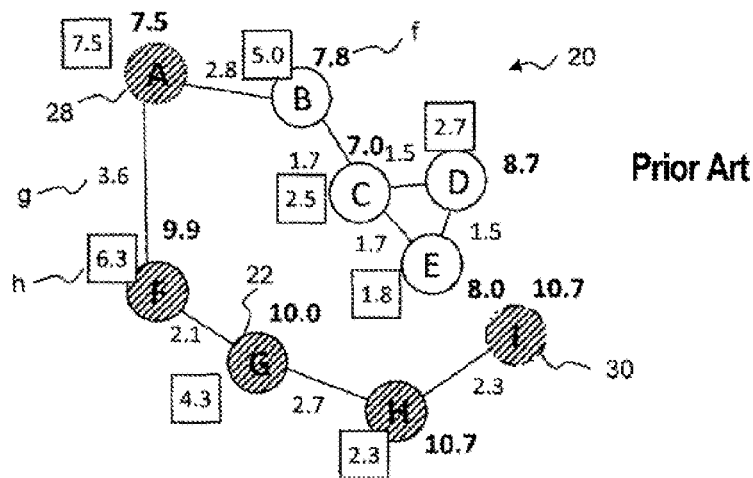

FIGS. 6A to 6C each show a graph for a predefined area 20 for determining a route from a starting node 28 to a destination node 30. The graph has nodes 22 and edges which are also called connections 24. The diagrams shown in FIGS. 6A to 6C are used to illustrate the determination of an optimum route using the A* algorithm according to the prior art. In this case, the optimum route is optimum with respect to the edge costs, for example the fastest, the shortest or the simplest.

In FIGS. 6A to 6C, names in the form of uppercase letters of the Latin alphabet are assigned to the nodes 22 for easier distinction. The starting node 28 has the letter A and is also called the A node below. The destination node 30 has the letter I and is also called the I node below.

The numbers in normal print which are shown in FIGS. 6A to 6C and are arranged beside the connections 24 represent respective edge costs g, for example a route distance between the two nodes 22 connected by the connection 24. A destination-node-based heuristic value h is assigned to each node 22 in the graph. The destination-node-based heuristic value h represents estimated costs based on the respective node 22 and the destination node 30.

In FIGS. 6A to 6C, the respective destination-node-based heuristic value h for the respective node 22 is entered in a box beside the respective node 22. The destination-node-based heuristic values h shown in FIGS. 6A to 6C each represent the Euclidean distance from the respective node 22 to the destination node 30.

In the case of the A* algorithm, the nodes 22 which are likely to quickly lead to the destination node 30 are always investigated first.

Starting from the starting node 28, total costs f are determined for the nodes 22 which have a connection 24 to the starting node 28. In the example shown in FIG. 6B, these are the B node and the F node.

The node 22 having the lowest total costs f is expanded next, that is to say, starting from this node 22, the total costs f of the nodes 22 having a connection 24 to this node 22 are determined.

In this case, the total costs f are the sum of the edge costs g of an optimum route from the starting node 28 to the current node 22a, also called cumulative edge costs below, plus the destination-node-based heuristic value h. The total costs can be determined according to the formula in equation 1:

$$f(x) = \text{cum}(x) + h(x) \qquad \text{Equation 1,}$$

where cum(x) represents the cumulative edge costs and h(x) represents the destination-node-based heuristic value h for a node x.

Based on the starting node 28, the A node in this case, with the numerical values indicated by way of example in FIG. 6A, the following results for the total costs f for the B node:

$$f(B,I) = \text{cum}(A,B) + h(B,I) = g(A,B) + h(B,I) = 2.8 + 5 = 7.8$$

and for the F node $$f(F,I) = \text{cum}(A,F) + h(F,I) = g(A,F) + h(F,I) = 3.6 + 6.3 = 9.9.$$

In this case, g(x,y) represents the edge costs g of the node x based on its neighboring node y which is a direct precursor node based on the optimum route.

In this case, the B node has the lower total costs f and is therefore expanded next.

With the numerical values indicated by way of example in FIG. 6A, the following total costs f result for the C node:

$$f(C,I)=\text{cum}(A,C)+h(C,I)=g(A,B)+g(B,C)+h(C,I)=7.00$$

The total costs f for the respective node 22 are each shown in bold beside the nodes 22 in FIG. 6C. Nodes 22 for which no total costs f have yet been determined are initially allocated the value infinite, as shown in FIGS. 6A and 6B.

As can be discerned from FIGS. 6A to 6C, neither the C node nor the D node nor the E node has a connection 24 to the destination node 30. In order to arrive at the I node from the E node, all nodes, the C, B, A, F, G and H nodes, must be passed through. Such a situation can occur, for example, if, in a real landscape area, a river, railroad tracks and/or another obstacle which cannot be overcome is/are situated between the E node and the I node. In this case, the selected heuristic function does not represent the real route and/or path conditions in the area 20 with sufficient accuracy and determination of the optimum route requires more computing steps and therefore takes longer.

In the situation shown in FIGS. 6A to 6C, the expansion is continued starting from the F node. The optimum route runs from the A node to the I node via the F, G and H nodes.

Figure 1:
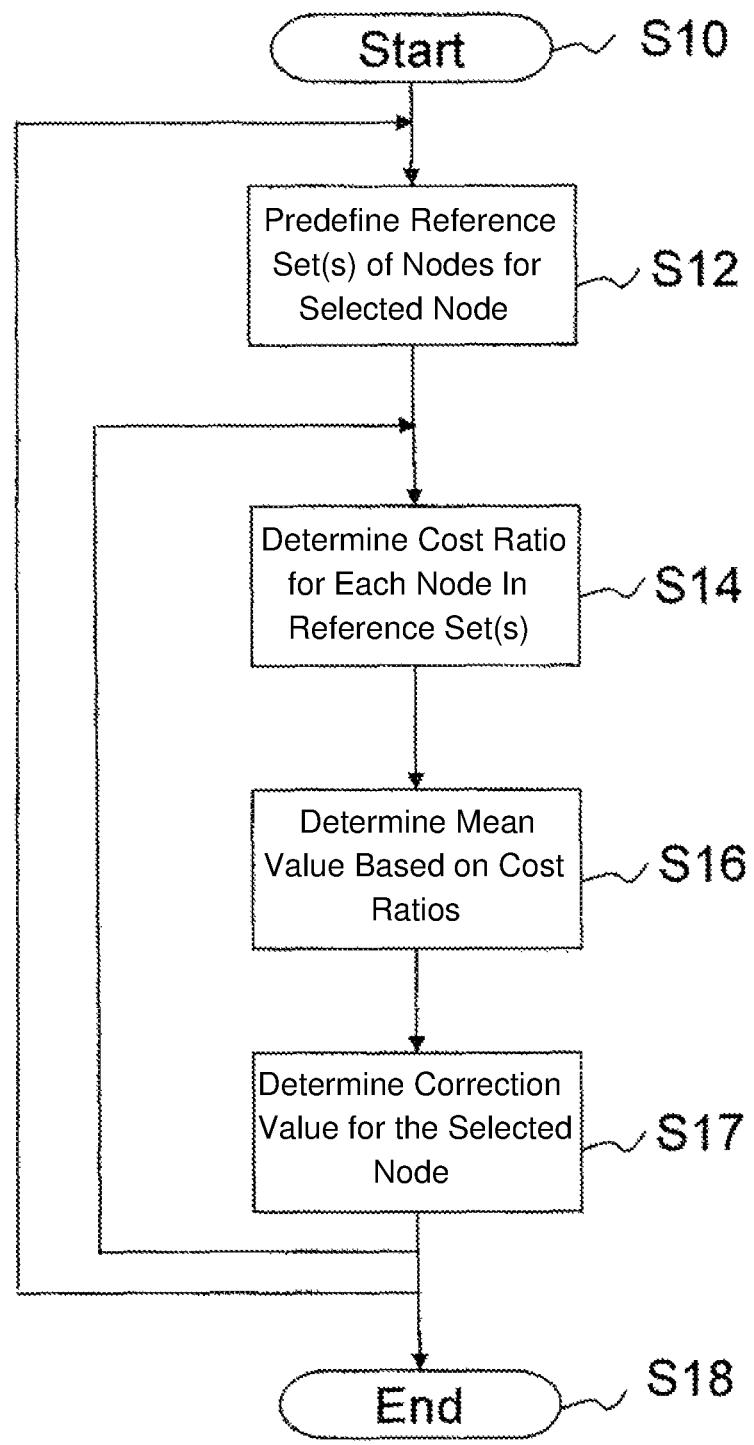
FIG. 1 is a flowchart for a first program for determining correction values for a route determination algorithm.

FIG. 1 shows an exemplary flowchart of a first program for determining correction values which can be used for a route determination algorithm, for example for the A* algorithm.

The correction values are determined on the basis of digital map data for a route network and/or path network in a predefined area 20. The digital map data include respective nodes 22 in the area 20 and connections 24 between the respective nodes 22 in the area 20. The digital map data also include respective edge costs g for the respective connections 24 between the nodes 22.

In the flowchart shown in FIG. 1, the first program is started in a step S10.

In a step S12, at least one reference set of nodes 22 is predefined for a selected node for which correction values are intended to be determined. In this case, a plurality of reference sets are preferably predefined for the selected node.

In a step S14, a cost ratio Cost is determined for each of the nodes 22 in the at least one reference set with respect to the selected node. This cost ratio Cost is determined on the basis of the edge costs g of the connections 24, which lie between the selected node and the respective node 22 in the reference set and represent an optimum route between the two nodes, and a heuristic value which relates to the two nodes.

In this respect, the digital map data may include the respective positions of the nodes, and the heuristic value for the selected node with respect to the respective node in the reference set may be respectively determined on the basis of the position of the selected node and the position of the respective node in the reference set. In this case, the respective heuristic value for the selected node with respect to the respective node in the reference set may represent, for example, the Euclidean distance between the selected node and the respective node in the reference set.

In a step S16, a mean value is determined on the basis of the determined cost ratios Cost of the nodes 22 in this at least one reference set.

In a step S17, the correction value for the selected node based on the nodes 22 in this reference set is determined on the basis of the mean value. In this case, the mean value may be directly assigned to the correction value or the mean value can be divided by a factor greater than one and can then be assigned to the correction value.

Starting from step S17, the program is continued in step S14 until the correction values have been determined for all reference sets for the selected node.

If the calculation of the correction values for the selected node has been concluded, a further node 22 in the area 20 is selected and the first program is run through again starting from step S12.

The first program is ended in a step S18 if the correction values have been respectively determined for at least a desired part of the nodes 22 in the area 20.

The individual program steps can alternatively also be carried out at least partially in an order other than that indicated in FIG. 1.

The correction values can be advantageously determined independently of current route determination. The determination of the correction values can be carried out once provided that no major changes occur with respect to the nodes 22 and connections 24 in the predefined area 20. This has the advantage, in particular, that very powerful computing units can be used for determination. For example, a compiler can be used to read in raw data relating to the road network and/or the path network in the area 20 and to select the data relevant to a predefined navigation system and/or driver assistance system and to calculate the correction values and to suitably combine these data in a compiled database and to store these data.

Figure 2A:
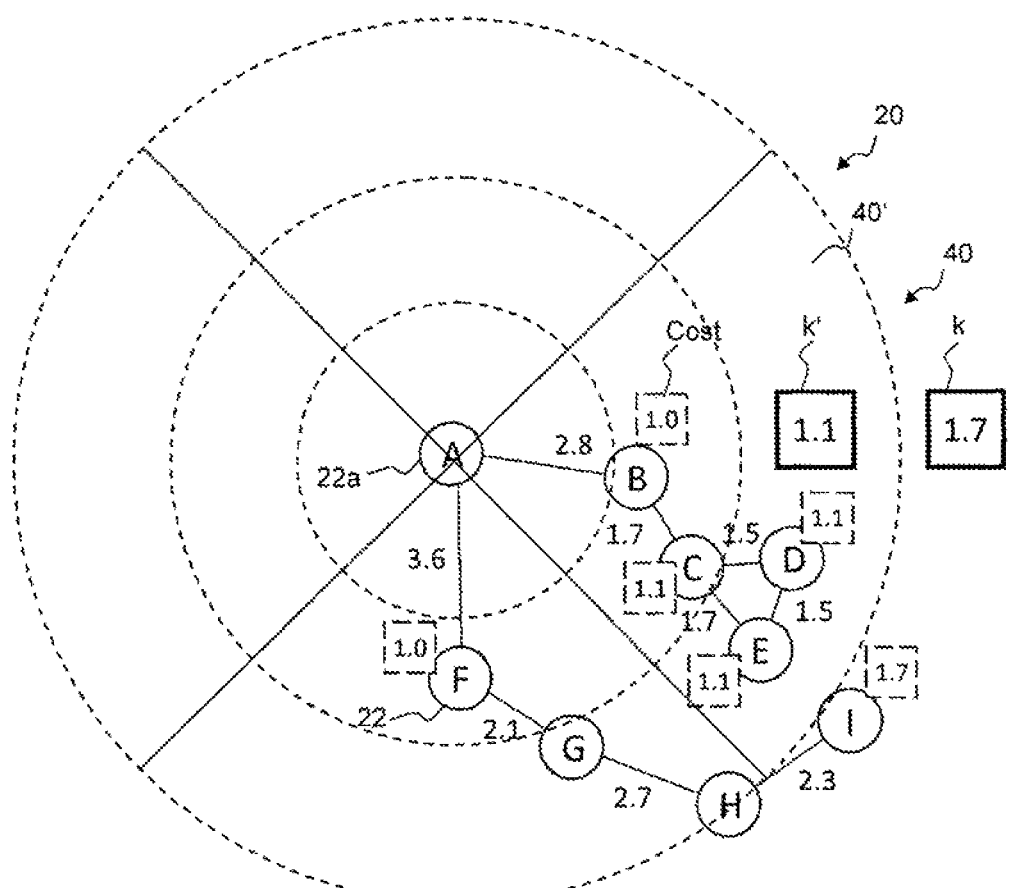
FIGS. 2A to 2C are diagrams for illustrating the determination of correction values.
Figure 2B:
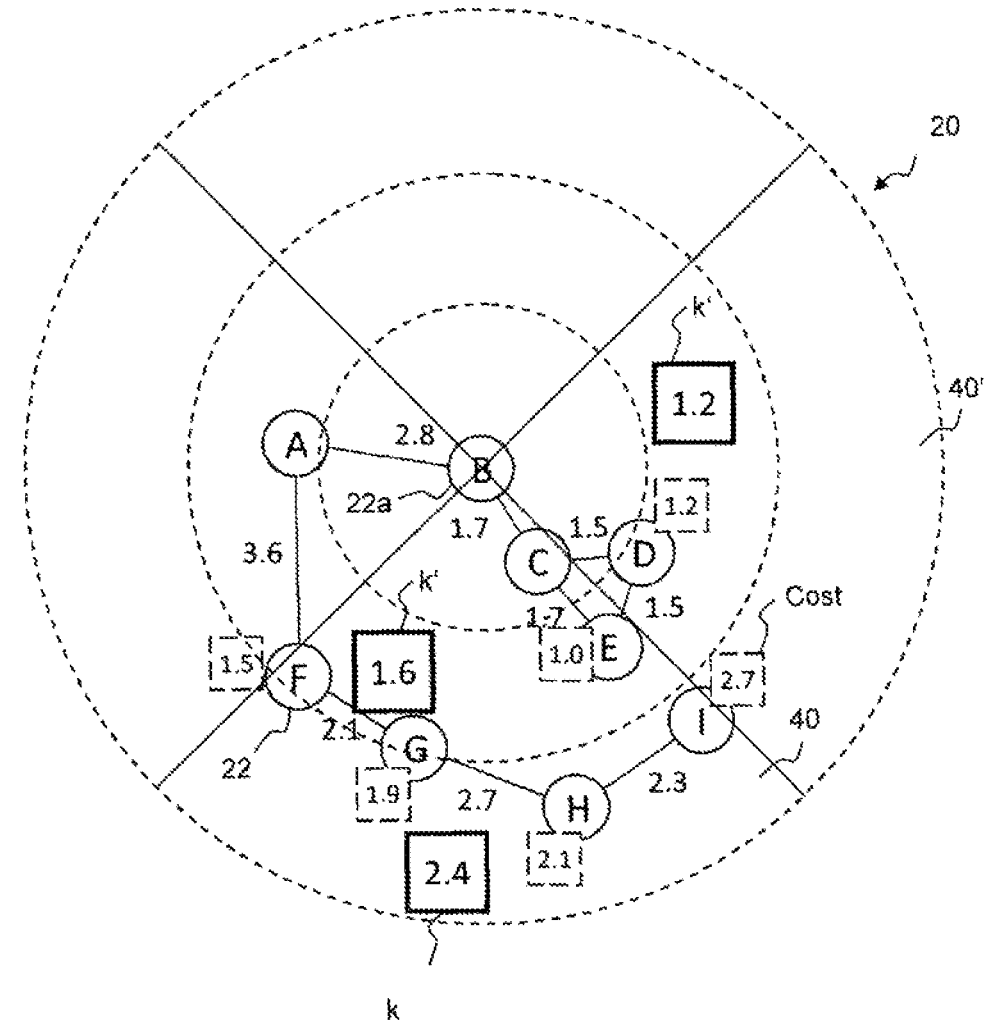
Figure 2C:
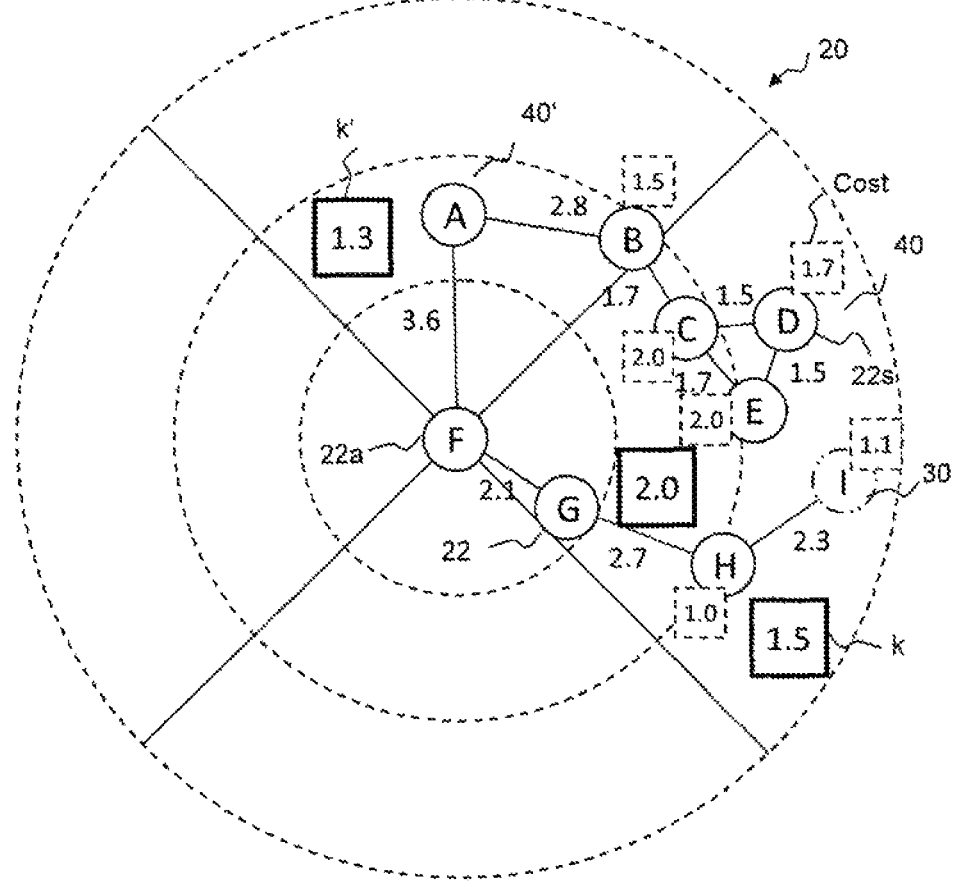

The diagrams shown in FIGS. 2A to 2C illustrate, by way of example, the determination of the correction values. The graphs shown in FIGS. 6A to 6C are the starting point here. In this case, the graphs each represent, by way of example, the route network and/or path network in the predefined area 20.

In this case, FIG. 2A illustrates, by way of example, the predefinition of the reference sets of nodes 22 for the A node, FIG. 2B illustrates the predefinition of the reference sets of nodes 22 for the B node, and FIG. 2C illustrates the predefinition of the reference sets of nodes 22 for the F node.

For this purpose, the area 20, for example, is subdivided into segment regions 40. The segment regions 40 therefore represent geographical subareas of the area 20, and selected nodes in the respective segment regions 40 each form one of the predefined reference sets of nodes. Alternatively, the respective predefined reference set may also include all nodes which are arranged in the respective segment region.

In the exemplary embodiments shown in FIGS. 2A to 2C, the predefined segment regions 40 of the area 20 each include a predefined radius region starting from the respective selected node, for which the correction values are determined, and a predefined angle region around the selected node. The area 20 is therefore subdivided into concentric circular segments based on the selected node.

Figure 3:
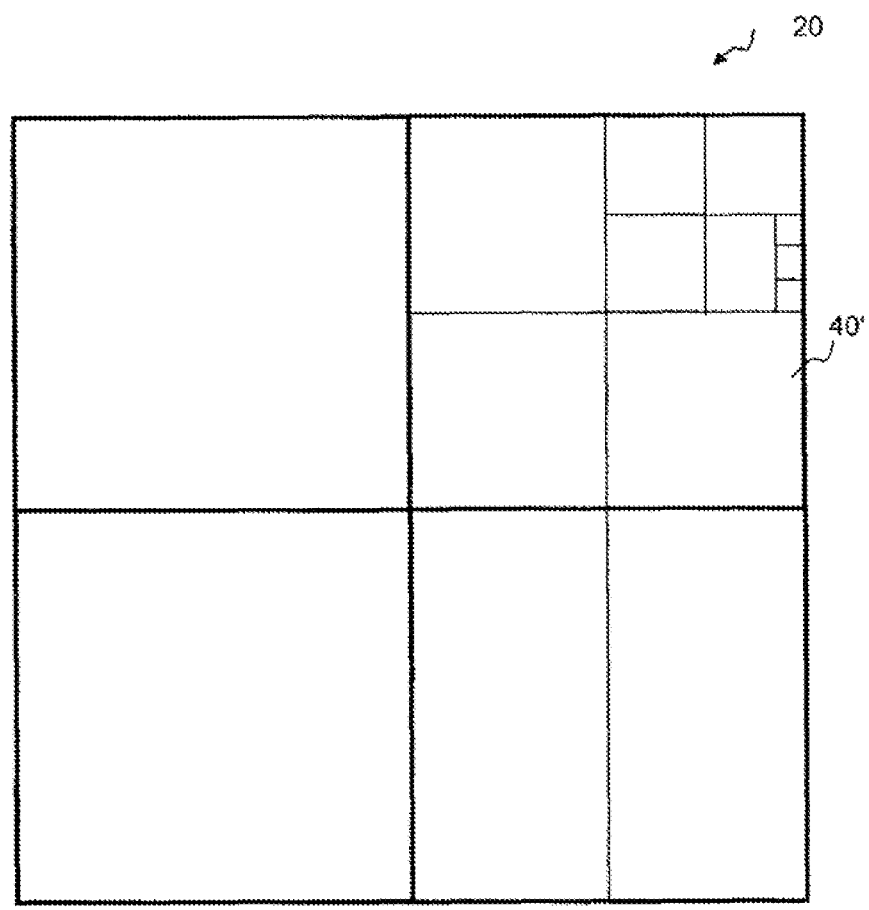
FIG. 3 is another exemplary embodiment for subdividing an area into segment regions.

The subdivision of the area 20 into segment regions 40, as shown in FIGS. 2A to 2C, is one possible exemplary embodiment. In particular, the number of segment regions 40 and their size may be selected differently with respect to the respective angle region and the respective radius region, for example on the basis of a possible storage capacity of a storage unit for storing the digital map data, for example a database for the navigation system, and/or on the basis of a number of accesses to such a storage unit and on the basis of the demands imposed on the reliability and efficiency of the route determination algorithm. The area 20 can also be alternatively subdivided into segment regions 40 along Cartesian coordinates, as shown in FIG. 3, for example. The segment regions 40 may have different sizes; for example, the segment regions 40 in urban areas with a high road density may be selected to be smaller than in rural areas with a relatively low road density.

For a first selected node z, for which the correction values are determined, and a second node m, which belongs to the at least one reference set of nodes 22, the cost ratio Cost can be determined according to equation 2:

$$\text{Cost}(z,m) = \text{cum}(z,m)/h(z,m) \quad \text{Equation 2,}$$

where cum(z,m) represents the sum of the edge costs g of an optimum route from the first selected node z to the second node m which belongs to the at least one reference set of nodes 22.

Figure 4A:
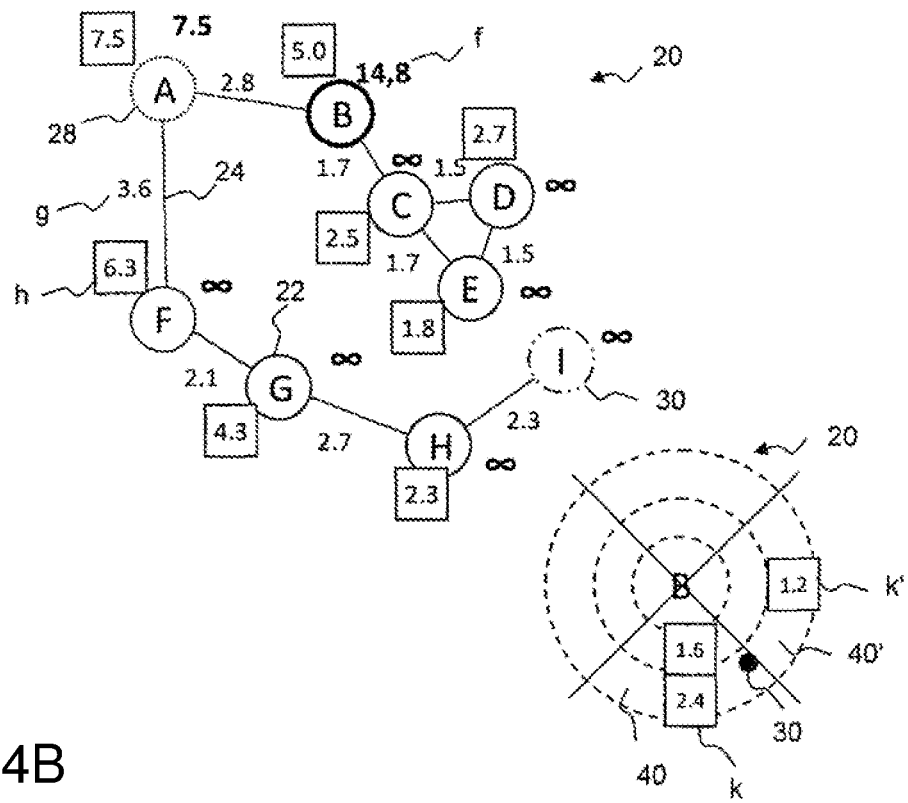
FIGS. 4A to 4C are diagrams for illustrating the determination of a route with the aid of the correction values.
Figure 4B:
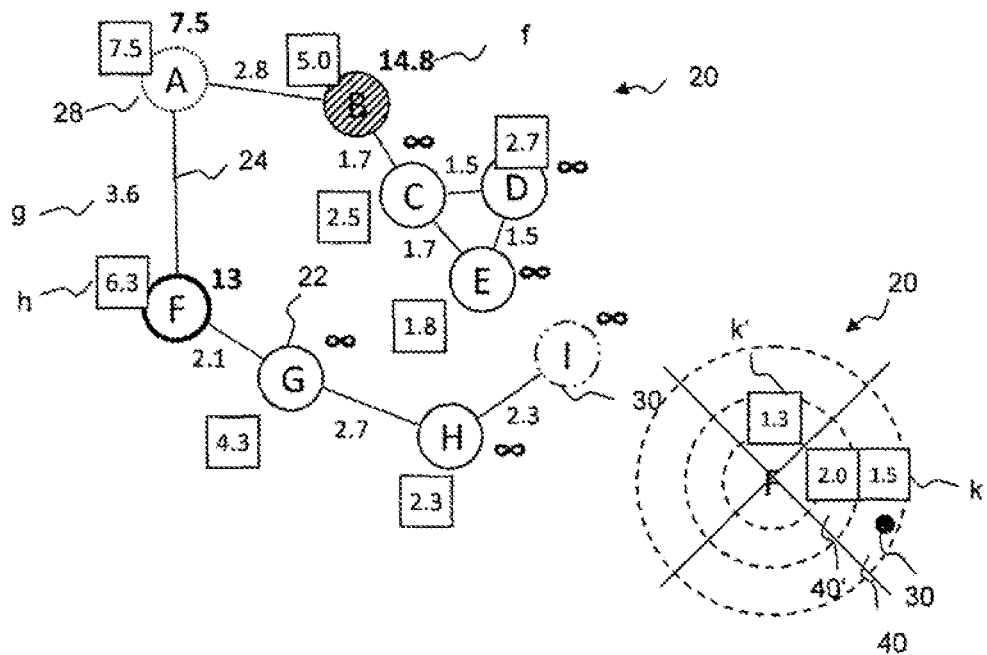

With the numbers from FIG. 6B (heuristic value h) and FIG. 4B (edge costs g), the following results for the B node based on the I node:

$$\text{Cost}(B, I) = \text{cum}(B, I)/h(B/I)$$
$$= (g(A, B) + g(A, F) + g(F, G) + g(G, H) + g(H, I))/h(B, I)$$
$$= (2.8 + 3.6 + 2.1 + 2.7 + 2.3)/5.0$$
$$= 2.7.$$

The correction value for the reference set of nodes 22 comprising the I node represents the mean value of all cost ratios Cost of this reference set. In the example shown in FIG. 2B, the correction value for the segment comprising the I node is equal to $$k'(B, \{H, I\}) = (\text{Cost}(B, H) + \text{Cost}(B, I))/2$$
$$= (2.1 + 2.7)/2 = 2.4.$$

For a further segment comprising the F, G and E nodes, the correction value is equal to:

$$k'(B, \{F, G, E\}) = (\text{Cost}(B, F) + \text{Cost}(B, G) + \text{Cost}(B, E))/3$$
$$= (1.5 + 1.9 + 1.0)/3 = 1.5.$$

In FIGS. 2A to 2C, the cost ratios Cost of the individual nodes 22 are indicated in the small boxes with a dashed edge and the respective correction values are indicated in the large boxes with a bold edge.

The correction values for the other nodes 22 can be determined in a similar manner.

Figure 4C:
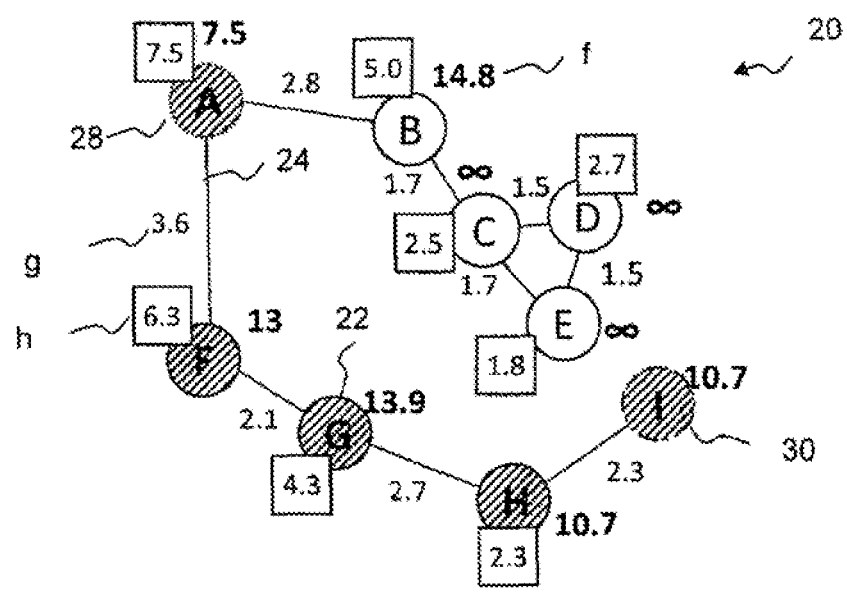

The diagrams shown in FIGS. 4A to 4C illustrate the determination of the route on the basis of the correction values.

The route can be determined using a suitable program on the basis of digital map data comprising the data which are also used to calculate the correction values and comprise the correction values.

The program can be executed by a suitable computing unit having a program memory. This computing unit can also be called an apparatus for determining a route and/or a route determination device.

In this case, the route from a predefined starting node 28 to a predefined destination node 30 is determined in such a manner that, for a possible expansion of a respective current node 22a, the total costs f for the current node 22a are determined on the basis of the sum of the edge costs g of the optimum route from the starting node 28 to the current node 22a and the predefined destination-node-based heuristic value h for the current node 22a and a predefined destination-node-based correction value k.

The total costs f for the node x can be calculated according to equation 3:

$$f(x) = \text{cum}(x) + h(x)*k(x) \quad \text{Equation 3}$$

In this case, k(x) is the destination-node-based correction value.

The following total costs f result for the B node based on the destination node 30 according to equation 3:

$$f(B, I) = \text{cum}(B, I) + h(B, I)*k(B, \{H, I\})$$
$$= g(A, B) + h(B, I)*k(B, \{H, I\})$$
$$= 2.8 + 5*2.4 = 14.8.$$

The following total costs f result for the F node based on the destination node 30 according to equation 3:

$$f(F, I) = \text{cum}(F, I) + h(F, I)*k(F, \{H, E, D, I\})$$
$$= g(A, F) + h(F, I)*k(F, \{H, E, D, I\})$$
$$= 3.6 + 6.3*1.5 = 13.1.$$

In this case, the F node has the lower total costs f and is therefore expanded next.

The total costs f for the respective node 22 are shown in bold in each case beside the node 22 in FIG. 4C.

The optimum route runs from the A node to the I node via the F, G and H nodes. In comparison with the determination of the route without correction values, the optimum route is determined in this case with considerably fewer calculation steps.

Figure 5:
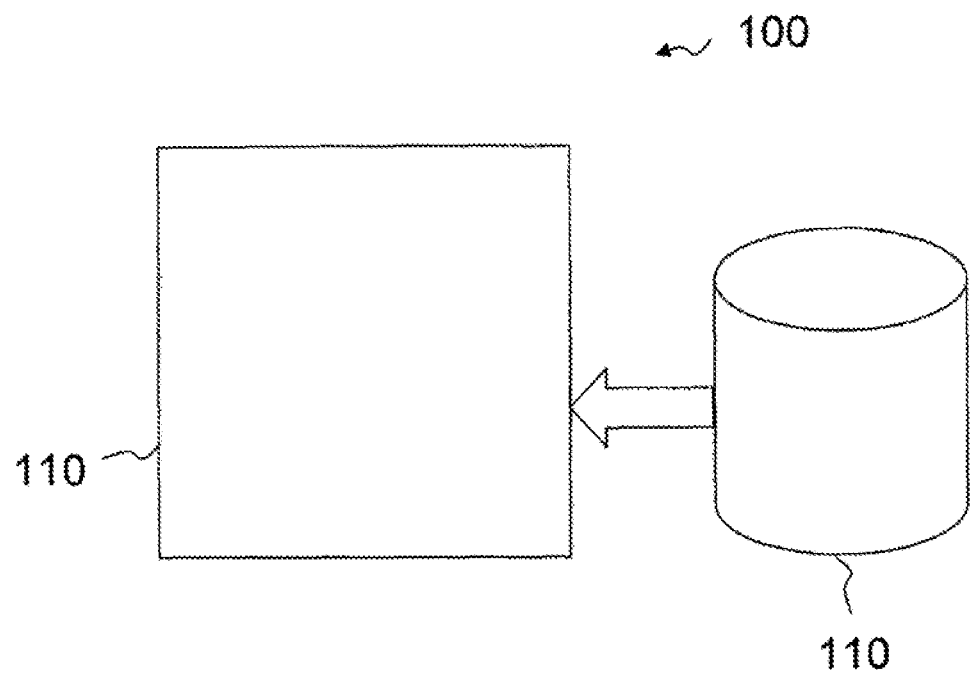
FIG. 5 is a block diagram of a system.

FIG. 5 shows a system including the storage unit and the apparatus for determining the route. The storage unit stores the digital map data for the route network and/or the path network in the predefined area 20. The apparatus is coupled to the storage unit using signaling and is designed to read the digital map data from the storage unit. In this case, the digital map data include the respective nodes 22 in the area 20 and the connections 24 between the respective nodes 22 in the area 20. The digital map data also include the respective edge costs g for the respective connections 24 between the nodes 22 and the predefined heuristic values for the respective nodes 22 with respect to the respective other nodes 22 in the area 20. The heuristic values each represent the estimated costs from one node 22 in each case to the other node 22 in each case. The digital map data also comprise the predefined correction values for the respective nodes 22.

The system may be part of a navigation system for a vehicle and/or for persons and/or part of a driver assistance system and/or a mobile terminal, for example a smartphone, and/or a computer. The storage unit may include a database, in particular.

LIST OF REFERENCE SYMBOLS

20 Area
22 Node
22a Current node

24 Connection
28 Starting node
30 Destination node
40 Segment region
40' Destination node segment region
100 System
110 Apparatus
120 Storage unit
g Edge costs
h Destination-node-based heuristics
k Destination-node-based correction value
k' Correction value based on a segment
Cost Cost ratio
f Total costs
S12, ..., S18 Program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a route for at least one of a navigation system and a driver assistance system with an associated storage unit in a vehicle for storing digital map data for at least one of a route network and a path network in a predefined area, the digital map data comprising:
   respective nodes in the predefined area and connections between the respective nodes in the predefined area,
   respective edge costs for the respective connections between the nodes, and
   predefined correction values for the respective nodes,
   wherein the method comprises the acts of:
   determining, by an apparatus including a processor programmed to determine the route, the route from a predefined starting node to a predefined destination node on the basis of the digital map data stored in the storage unit wherein, for a possible expansion of a respective current node, total costs are determined for the current node based on:
   (i) a sum of edge costs (g) of an optimum route from the starting node to the current node and a destination-node-based heuristic value (h) for the current node, which represents respectively estimated costs from the current node to the destination node, and
   (ii) a predefined destination-node-based correction value (k) which is representative of a mean value of cost ratios (Cost) of respective nodes in a predefined set, wherein the respective cost ratios (Cost) are dependent on:
   the edge costs of the connections, which lie between the current node and the respective node in the set and represent an optimum route between the current node and the respective node in the set, and
   a heuristic value for the current node with respect to the respective node in the set; and
   forwarding the determined route to the at least one of the navigation system and the driver assistance system for at least one of indicating the determined route and controlling the vehicle.

2. The method according to claim 1, wherein the digital map data comprise the respective positions of the nodes, and the method further comprises the act of:
   determining the destination-node-based heuristic value on the basis of the position of the current node and the position of the destination node.

3. The method according to claim 1, wherein the digital map data comprise predefined heuristic values for the respective nodes with respect to respective other nodes in the predefined area, which each represent estimated costs from one node in each case to the other node in each case, and the destination-node-based heuristic value is therefore predefined.

4. The method according to claim 1, wherein:
   the respective destination-node-based heuristic value represents a Euclidean distance between the current node and the destination node.

5. The method according to claim 1, wherein the heuristic value for the current node with respect to the respective node in the set represents a Euclidean distance between the current node and the respective node in the set.

6. The method according to claim 1, wherein:
   the predefined area is subdivided into a plurality of segment regions, and
   the respective nodes in the predefined set comprises selected nodes which are arranged in a destination node segment region which comprises at least the destination node.

7. The method according to claim 1, wherein the mean value of the cost ratios of the respective nodes in the predefined set represents an arithmetic mean value of the cost ratios.

8. The method according to claim 6, wherein the respective segment region of the predefined area comprises a predefined radius region starting from the current node and a predefined angle region around the current node.

9. The method according to claim 7, wherein the respective segment region of the predefined area comprises a predefined radius region starting from the current node and a predefined angle region around the current node.

10. A method for determining correction values for a route calculation algorithm based on digital map data for at least one of a route network and a path network in a predefined area, the digital map data comprising:
    respective nodes in the predefined area and connections between the respective nodes in the predefined area, and
    respective edge costs for the respective connections between the nodes,
    the method comprising the acts of:
    predefining, by an apparatus including a processor programmed to determine a route, at least one reference set of nodes for at least some of the nodes in the predefined area for the respective node, and
    for the at least one predefined reference set of nodes:
    determining, by the apparatus including the processor programmed to determine the route, a cost ratio for the respective node in the reference set based on:
    the edge costs of the connections, which lie between the node, for which a correction value is determined, and the respective node in the reference set and represent an optimum route between the node, for which the correction value is determined, and the node in the reference set, and
    a heuristic value for the node, for which the correction value is determined, with respect to the node in the reference set,
    determining, by the apparatus including the processor programmed to determine the route, a mean value based on the determined cost ratios of the nodes in the reference set, and determining, by the apparatus including the processor programmed to determine the route a correction value based on the mean value.

11. The method according to claim 10, wherein the digital map data comprise the respective positions of the nodes, wherein the act of determining the heuristic value for the node, for which the correction value is determined, with respect to the respective node in the reference set is based on the position of the node, for which the correction value is determined, and the position of the respective node in the reference set.

12. The method according to claim 10, wherein the digital map data comprise predefined heuristic values for the respective nodes with respect to the respective other nodes in the predefined area, which each represent estimated costs from one node in each case to the other node in each case, and the heuristic value for the node, for which the correction value is determined, with respect to the respective node in the reference set is therefore predefined.

13. The method according to claim 10, wherein
the heuristic value for the node, for which the correction value is determined, with respect to the node in the reference set represents a Euclidean distance between the node, for which the correction value is determined, and the node in the reference set.

14. The method according to claim 10, wherein:
the predefined area is subdivided into a plurality of segment regions starting from the respective node for which the correction values are calculated, and
selected nodes in the respective segment regions each form one of the predefined reference sets of nodes.

15. The method according to claim 14, wherein
the predefined segment regions in the predefined area each comprise a predefined radius region starting from the respective node, for which the correction value is determined, and a predefined angle region around this node for which the correction value is determined.

16. An apparatus for determining a route for at least one of a navigation system and a driver assistance system with an associated storage unit for storing digital map data for at least one of a route network and a path network in a predefined area, the digital map data comprising:
respective nodes in the predefined area and connections between the respective nodes in the predefined area,
respective edge costs for the respective connections between the nodes, and
predefined correction values for the respective nodes,
wherein the apparatus comprises a processor that executes a program to:
determine the route from a predefined starting node to a predefined destination node on the basis of the digital map data stored in the storage unit such that, for a possible expansion of a respective current node, total costs are determined for the current node based on:
(i) a sum of edge costs (g) of an optimum route from the starting node to the current node and a destination-node-based heuristic value (h) for the current node, which represents respectively estimated costs from the current node to the destination node, and
(ii) a predefined destination-node-based correction value (k) which is representative of a mean value of cost ratios (Cost) of respective nodes in a predefined set, wherein the respective cost ratios (Cost) are dependent on:
the edge costs of the connections, which lie between the current node and the respective node in the set and represent an optimum route between the current node and the respective node in the set, and
a heuristic value for the current node with respect to the respective node in the set.

17. A system, comprising:
a storage unit that stores digital map data for at least one of a route network and a path network in a predefined area, the digital map data comprising:
respective nodes in the predefined area and connections between the respective nodes in the predefined area,
respective edge costs for the respective connections between the nodes, and
predefined correction values for the respective nodes;
an apparatus for determining a route, the apparatus being coupled with the storage unit and being configured to read the digital map data from the storage unit, wherein the apparatus comprises:
a processor that executes program code to:
determine the route from a predefined starting node to a predefined destination node on the basis of the digital map data stored in the storage unit such that, for a possible expansion of a respective current node, total costs are determined for the current node based on:
(i) a sum of edge costs (g) of an optimum route from the starting node to the current node and a destination-node-based heuristic value (h) for the current node, which represents respectively estimated costs from the current node to the destination node, and
(ii) a predefined destination-node-based correction value (k) which is representative of a mean value of cost ratios (Cost) of respective nodes in a predefined set, wherein the respective cost ratios (Cost) are dependent on
the edge costs of the connections, which lie between the current node and the respective node in the set and represent an optimum route between the current node and the respective node in the set, and
a heuristic value for the current node with respect to the respective node in the set.

18. The system according to claim 17, wherein the digital map data comprise the respective positions of the nodes, and the processor further executes program code to:
determine the destination-node-based heuristic value on the basis of the position of the current node and the position of the destination node.

19. The system according to claim 17, wherein
the digital map data comprise predefined heuristic values for the respective nodes with respect to respective other nodes in the predefined area, which each represent estimated costs from one node in each case to the other node in each case, and the destination-node-based heuristic value is therefore predefined.

20. The system according to claim 17, wherein
the respective destination-node-based heuristic value represents a Euclidean distance between the current node and the destination node.

* * * * *